United States Patent [19]

Carter, II

[11] Patent Number: 5,060,133
[45] Date of Patent: Oct. 22, 1991

[54] TRANSPUTER CNC PROCESSOR
[75] Inventor: Woodward C. Carter, II, Maitland, Fla.
[73] Assignee: Automation Intelligence, Inc., Orlando, Fla.
[21] Appl. No.: 475,743
[22] Filed: Feb. 6, 1990
[51] Int. Cl.$^5$ .............................................. G06F 15/46
[52] U.S. Cl. ................ 364/192; 364/474.15; 364/474.31
[58] Field of Search ........... 364/191, 192, 138, 474.11, 364/474.15, 474.31

[56] References Cited
U.S. PATENT DOCUMENTS

| | | | |
|---|---|---|---|
| 4,809,154 | 2/1990 | Newton | 364/148 |
| 4,901,218 | 2/1990 | Cornwell | 364/138 |

Primary Examiner—Jerry Smith
Assistant Examiner—Paul Gordon
Attorney, Agent, or Firm—Macdonald J. Wiggins

[57] ABSTRACT

A processor for a computerized numerical controller for providing motion planning and interpolation has a first transputer element programmed to convert program data to fixed format binary data and to store converted data in a generated convert data buffer. The convert data buffer is transmitted to a second transputer element programmed to precalculate motion control data therefrom and stores such precalculated data in a generated precalculated data buffer. The precalculated data buffer is transmitted to a third transputer element programmed to interpolate the precalculated data to provide a real time interpolated point stream defining a motion trajectory.

6 Claims, 3 Drawing Sheets

TRANSPUTER CNC PROCESSOR

BACKGROUND OF THE INVENTION

1. Field of the Invention

The present invention relates to computerized numerical control (CNC) systems, and more particularly to a motion planning and interpolation processor having multiple microprocessors without shared memories and using Inmos transputer microprocessors.

2. Description of the Prior Art

Computerized numerical controllers (CNC) are utilized to control machine tools. A typical CNC is a complex system whose function it is to take a part program input and produce outputs that cause controlled motions of the controlled axes of machine tools and similar apparatus. The CNC system coordinates interaction with other aspects of its physical environment including analog and digital inputs and outputs to and from devices, sensors, and other subsystems, and interacts with operator oriented man machine interface devices as well as with data oriented devices such as part program storage, supervisory computer links, and the like.

A simplified block diagram of a typical prior art CNC is shown in FIG. 1 of the drawings. The part program describing the actions the CNC is to cause to be executed is prepared in a suitable format such as the EIA RS-274D programming standard on suitable media, such as 8 track punched tape, and read into the CNC by an input device, such as a punched tape reader. This tape is acted upon by the CNC processor which in turn controls servo motor drives and other devices that control the machine tool or other machinery controlled by the CNC. The system also includes sensors and other input and output devices, including those used by the operator and those associated with the machine tool and its support devices. The motion planning and interpolation functions of a CNC, in the past, been heavily based on shared memory, with the motion planning broken into parts and partial results passed via shared memory with the interpolation mechanisms accessing the final result and the real-time status of the system via shared memory. Message passing has also used, but is relatively slow and often based on shared memory in its implementation to avoid data recopying.

There is a need for a CNC processor element of a CNC that does not require shared memory and that can provide a looser coupled system with the performance of a close coupled system.

In recent years, multiple microprocessor architecture emphasizing fast, on-chip computation including on-chip multi-tasking and communication channels to other chips of the same architecture, has been developed which is applicable to state of the art CNC systems. A chip known as an "Inmos transputer (XP)" is the basis for such architecture. A typical chip is the Inmos T800. The present invention utilizes an Inmos transputer chip to provide an improved motion planning and interpolation element of a CNC.

SUMMARY OF THE INVENTION

The present invention is a CNC processor having an XP chip-based motion planner and interpolator system having multiple XP microprocessors for receiving a program from an input source and producing a stream of interpolated points for axis controllers to execute, without the use of shared memories. The XP provides a unique capability for fast, 32-bit word computation at an economical cost. The invention includes a novel architecture that does not require shared memories among XPs. Microprocessor produced data buffers are continuously created and messages stored therein. The message in the originating buffer is passed along to the next processor into a similar buffer, thus eliminating shared memories.

The functions of the invention are shown in FIG. 2 showing the input from the program source and the real time interpolated point stream output. A functional block diagram of a prior art CNC is presented in FIG. 3. The motion planner and interpolator presents in real time a stream of control points to the control loop closure mechanisms, usually a stream of desired positions in the coordinate space understood by the servo drives on the controlled machine. The control loops require feedback from the controlled machine which is provided by sensors. Modern systems may have very sophisticated sensors which may be control systems in themselves which can affect the operation through their own actuators or through real time feedback to the control loop closure or the motion planner/interpolator. The system may include programmable logic controller functions for controlling/sequencing devices associated with the controlled machine and will usually include a man machine interface (an operator's panel or terminal or personal computer (CRT/Keyboard) and a data device interface (a tape reader or disk). Modern systems will also have a communication means for communicating with the rest of the factory.

As will be disclosed, the invention provides the motion planning and interpolation functions of the CNC.

The invention includes a plurality of XP chips, referred to hereinafter as "XPs". For example, three main XPs provide: a convert/coordinate function; a precalculate/motion plan function; and an interpolate/execute function, respectively. Currently available XPs have four input channels and four output message channels. Two auxiliary XPs provide an adaptive/application function, and a manual/modify function. The XPs are interconnected by message passing channels. Each XP can generate a data buffer in which it produces operational messages. A completed buffer is sent by a transmit process from one XP to a receive process of the next XP for further processing. A single XP may support multiple tasks in its hardware and can appear functionally as multiple XPs.

It is therefore a principal object of the invention to provide a CNC system using XP chips to provide the motion planning and interpolation functions of a CNC.

It is another object of the invention to provide a CNC system having no shared memories that utilizes message passing among its constituent multiple microprocessors.

It is still another object of the invention to provide a CNC motion planning and interpolation system based on multiple microprocessors without shared memory for producing a stream of interpolated points for axis controllers to execute.

It is yet another object of the invention to provide a CNC processor having XP chips programmed to create needed resources including data buffers and processes needed to run concurrent operations.

It is another object of the invention to provide a CNC motion planning and interpolation processor using low cost transputer elements for producing operational messages which are passed along for processing.

DETAILED DESCRIPTION OF THE PREFERRED EMBODIMENT

Figure 1:
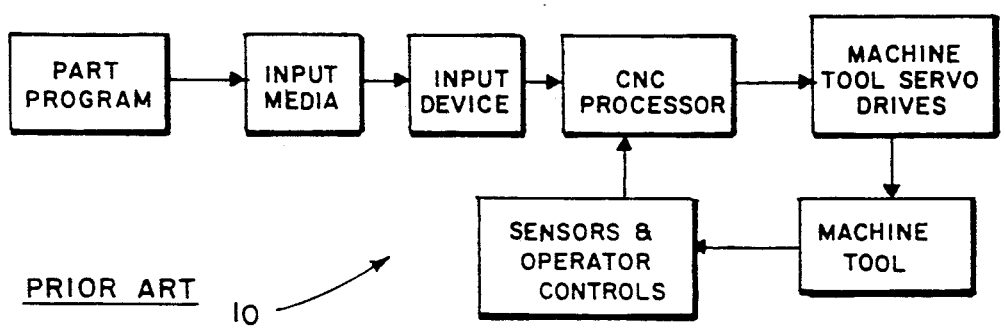
FIG. 1 is a simplified block diagram of a generic computerized numerical controller of the prior art.

In the detailed description of the preferred embodiment, the following acronyms, which are known in the art, will be used:

CNC computerized numerical controller;
RS-274D EIA programming standard;
BLOCK analogous to a single program line in a computer language;
CONVERT the function of processing a block into a fixed format with more structure than the original input;
CDB converted data buffer for storing the converted blocks;
PRECAL a precalculation motion-planning function that processes data from a CDB into an expanded format suitable for execution with and coordination with other CNC functions; and
PCB precalculated data buffer for storing the precalculated blocks;

Referring to FIG. 1, a block diagram of a generic prior art CNC 10 is shown. A part program is prepared in a format suitable to the system, utilizing, for example, the EIA RS-274 programming standard. The input media required by the CNC processor 12, such as punched tape, is prepared to read the part program into CNC processor 12 via a suitable input device. The program describes the actions to be performed by machine tool 16. The CNC processor acts on the input commands to control machine tool servo motor drives 14 and other input devices which control machine tool 16. Sensors and other input and output devices (which include operator controls) associated with machine tool 16 provide feedback to CNC processor 12.

The present invention relates to CNC processor 12 as will be described hereinafter. The CNC processor 12 is implemented using transputer chips as will be discussed hereinbelow.

Figure 2:
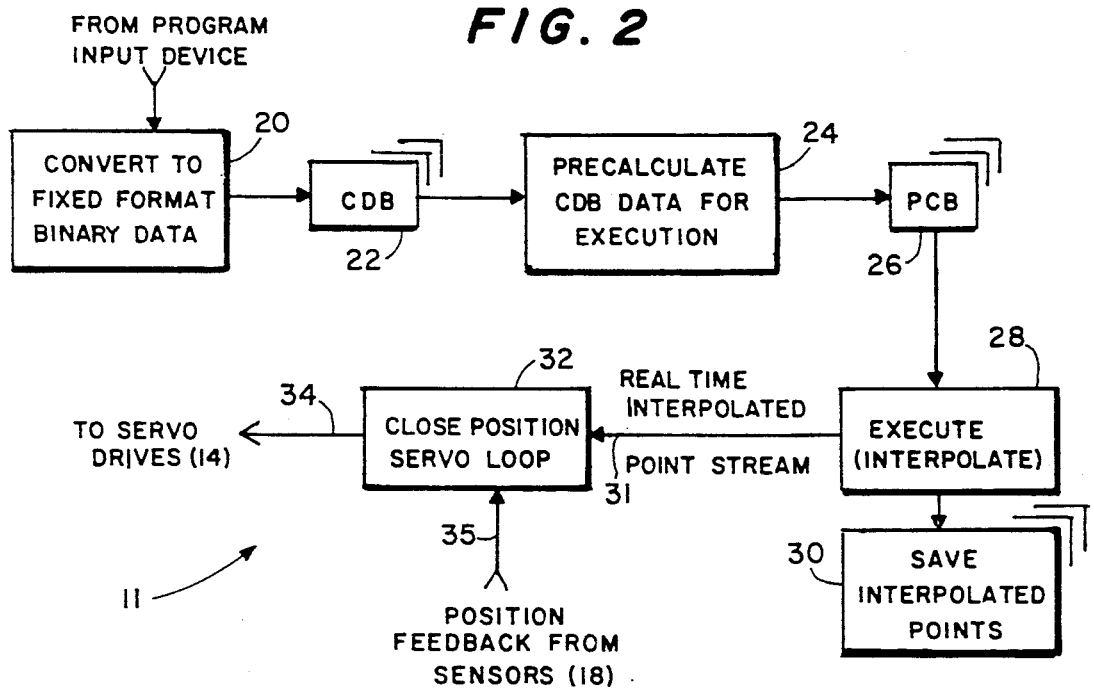
FIG. 2 is a functional diagram of the CNC processor of FIG. 1 which is applicable to prior art processors and the processor of the invention.
Figure 3:
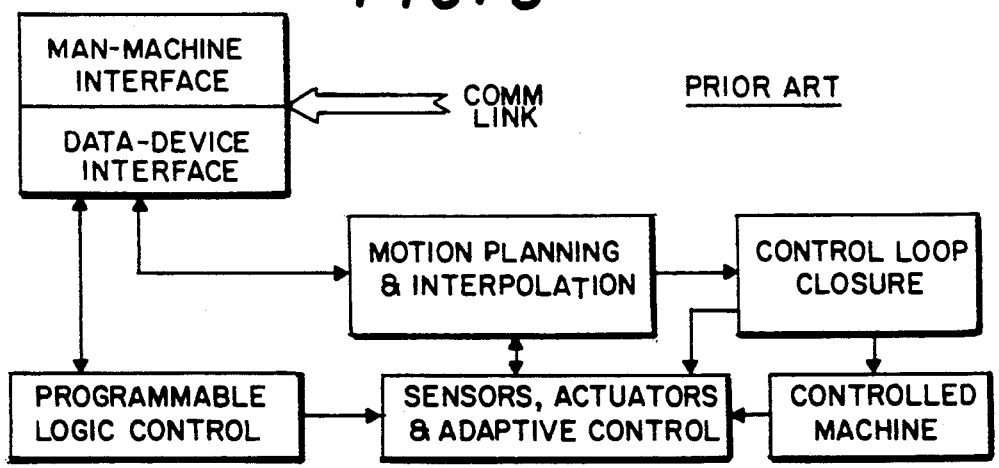
FIG. 3 is a functional diagram of a prior art CNC indicating the function of the invention.

The process in accordance with the invention is shown in simplified functional form in FIG. 2. The part program from the input device is converted to fixed format binary data by reading a BLOCK of data and processing the data into a format having more structure than the original data, referred to as the CONVERT function 20.

The converted data is stored in CDBs 22. CNC processor 11 next processes (precalculates) the structured data from CDBs 22, that affect motion of the machine tool, by function 24, into an expanded form suitable for eventual execution. These data must be coordinated with other CNC functions prior to execution of a motion command. The PRECAL data is stored in PCBs 26.

The PRECAL function 24 of the CNC processor is used repetitively and with other coordination inputs to produce a desired trajectory of motion. This process is referred to as motion execution 28 or interpolation. The real time interpolated point stream on bus 31, which defines the desired trajectory, and the actual trajectory information feedback from sensor 18, closes the position servo loop 32 to produce outputs 34 to servo drives 14. This process is called the "close position loop" or DPE function.

Figure 4:
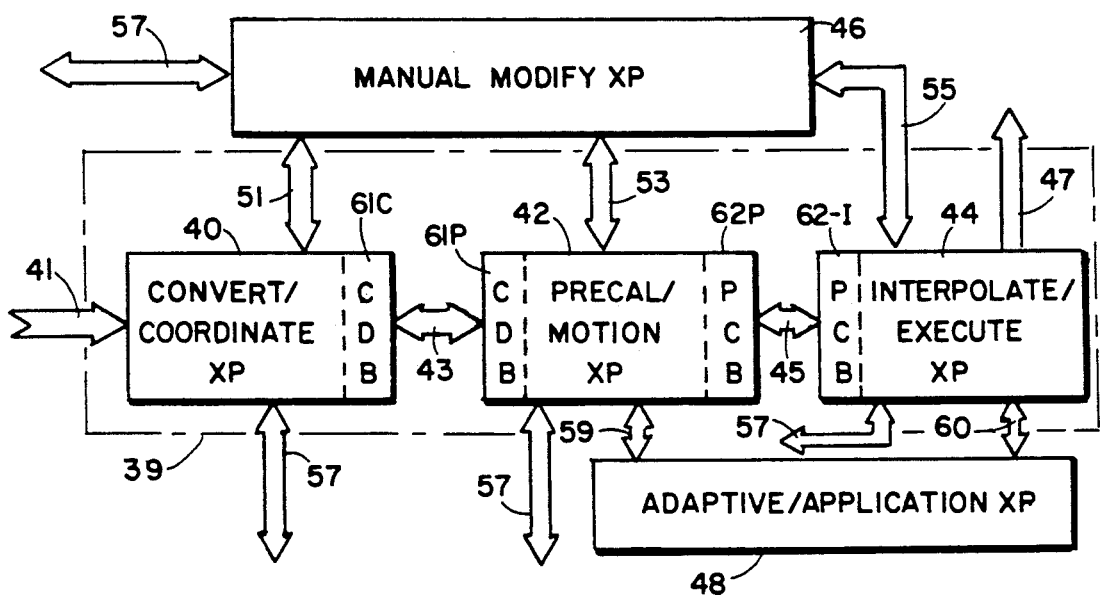
FIG. 4 is a block diagram of the CNC processor of the invention.

The invention is concerned principally with CNC processor 12 of FIG. 1 and is configured as indicated in FIG. 4. Convert, pre-cal, and interpolate (CPI) element 39 consists of: XP 40, which provides the convert function 20 of FIG. 2; XP 42, which provides the precalculate function 24 of FIG. 2; and XP 44, which provides the interpolate/execute function 28 of FIG. 2. The program to be executed is input on channel 41 to XP 40 and appears in interpolated form on output channel 47.

Each XP 40, 42 and 44 includes RAMs for temporary storage of messages that pass through the processor.

Figure 5:
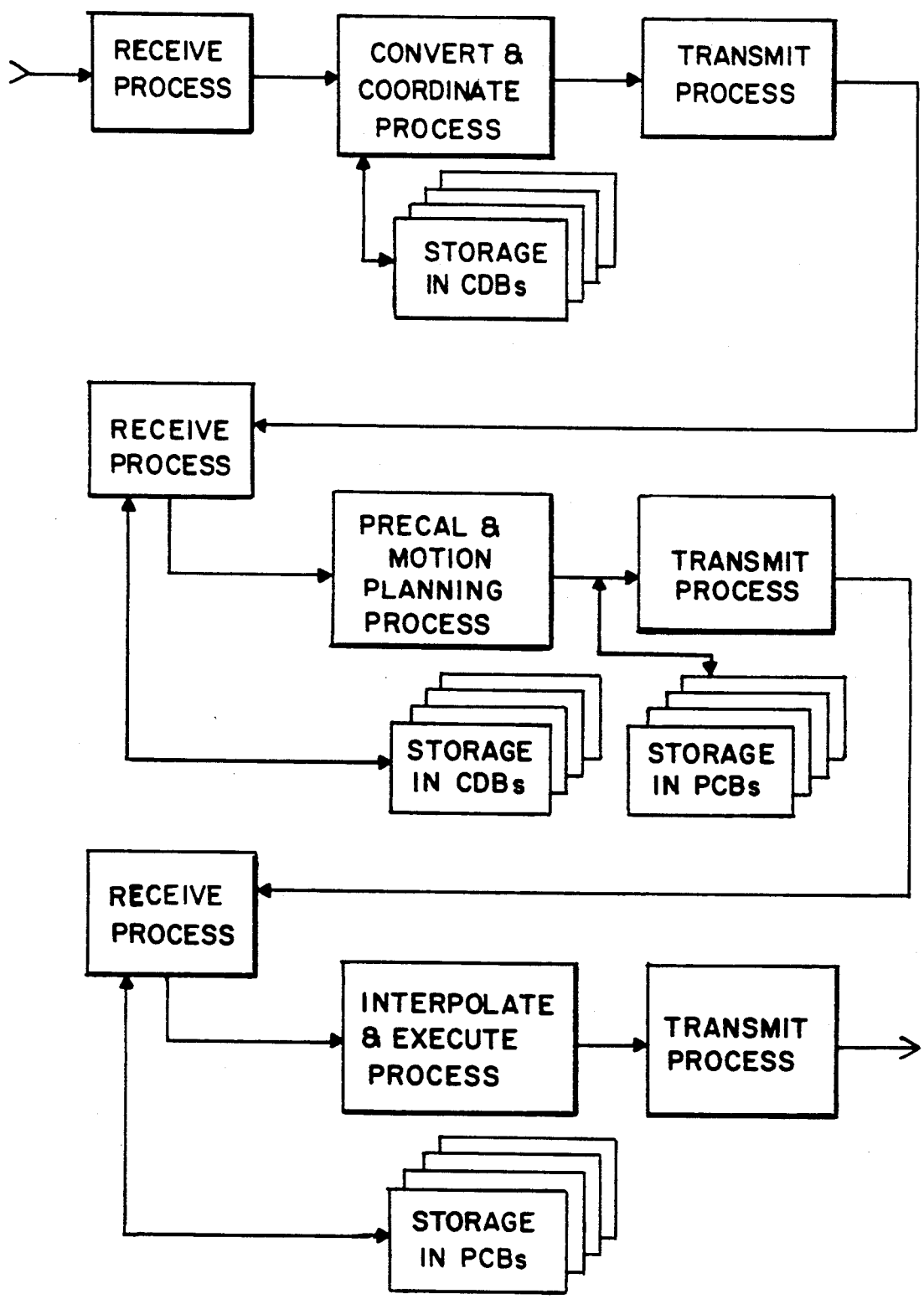
FIG. 5 is a flow diagram diagram of the processes of a CNC processor in accordance with the invention.

FIG. 5 is a detailed flow diagram of the processes of FIG. 2 through the transputer-implemented CPI element 31 of FIG. 4. The operation of the invention will be discussed in more detail with reference to FIGS. 4 and 5.

The microprocessors of XPs 40, 42, and 44 are individually programmed. A C-program for convert XP 40 contains a main program and a program for reading the RS-274 program for the convert function. The C-program controls XP 40 to create CDBs 61C in RAM for messages and to create the convert processes required to run concurrently, and to start such processes. When the C-program starts, it loops continuously. A P-program for precal XP 42 includes a detailed control program for motion planning steps, and motion precalculation programs for linear motions, circular motions in a principal plane, circular motion in an arbitrary plane, and motions for related compensation. As in the convert process, when the precal process is started, it loops continuously. The P-program creates two concurrent processes. First, a receive process is created that continually loops waiting for messages from CDB 61C output from XP 40. Such messages are copied into CDP 61P, formed in an XP 42 RAM, to be operated on. When messages are transmitted from XP 40 to XP 42, the ram allocation in XP 40 for that message is dissolved. During the precalc process, a second process for transmitting the messages it generated which continually loops while waiting for the completed PCBs 62P to be produced.

When the PCBs 62P are completed, these are incorporated into a message mechanism and sent to XP 44 for interpolation/execution. Similarly, an I-program includes programs for control of motion interpolation, and motion interpolation functions. The I-program produces a receive process and PCB 62I for receiving completed messages from XT 42. Thus, when the messages from XP 42 are completed, that transputer incorporates the PCBs 62P into a message mechanism which is sent to PCB 62I, formed in XP 44, for interpretation/execution. With reference to FIG. 4, CDBs 61C and PCBs 62P may be augmented as required. XP 40, XP 42, and XP 44, at any time, maintain an accurate image of the external world. Changed events may be manually communicated via channels 51, 53 and 55 from manual modify XP 46. Channels 57 to XPs 40, 42, 44 and 46 are available for initial loading, and for communication of diagnostic and status information. XP 40 is the coordination XP and also does the convert function of the CNC processor. XP 42 is the main motion planning XP and also does the precal function of the CNC processor. XP 44 is the interpolation XP and performs that function. XPs 42 and 44 each devote a channel 59, 60 to communication with XP 48. XP 48 is the adaptive control XP and in general handles proprietary and experimental functions implemented by the user of the CNC rather than by the designer of the standard CNC controller. Such functions in general will require real time modification of the interpolation and motion planning functions; the channels 57 and 60 provide this capability.

Processing a program in an orderly data stream from channel 41 through channels 43 and 45 and on to channel 47 is the most common use of an "in production" CNC but there are times when exceptions are encountered and modifications must be made to this process, often manually. This function is provided as shown in FIG. 4 by XP 46. The channels 51, 53 and 55 from XPs 40, 42 and 44 to XP 46 represent the capabilities embodied in XPS 40, 42 and 44 to properly provide information to and react to data from XP 46.

XP 40 includes channel 57 which may be used for coordination with other parts of the CNC.

The architecture of the invention is totally message based without shared inter-processor storage. The several XPs of CPI 39 each internally maintains the status of the entire system. To accomplish this, CPI 39 maintains monitoring processes at their input channels ready to change their internal system status image.

XPs 46 and 48 send messages to the XPs of CPI 39 whenever the state of the system changes and the XPs of CPI 46 requires notification.

The XPs of CPI 39 sends messages to XP 46 whenever an "unusual" change to the state of the system is made and other parts of the system require notification. The channel 43 from convert XP 40 to pre-cal 42 consists of augmented CDBs 61 that maintain system status information consistent with the normal programmed information contained in the CDB.

The channel 45 from XP 42 to XP 44 consists of augmented PCBs 62 that include system status information consistent with the normal programmed information contained in the PCB and the result of precalculations based on that data.

As will now be recognized, the invention provides a message based CNC processor has been disclosed using low cost transputer chips programmed to provide the described functions. A typical chip eminently suited for the invention is the Inmos T800, although other types may be suitable. Although a specific implementation of the invention has been disclosed, various modifications and rearrangements may be made thereto without departing from the spirit and scope of the invention.

I claim:

1. A processor for a computerized numerical controller (CNC) to provide motion planning and interpolation in which said CNC reads a part program describing actions to be performed by a controlled machine tool, comprising:

a first transputer element programmed to create convert processes for operation on data read from said part program, to create at least one convert data buffer (CDB), to convert said data to fixed format binary data, and to store said converted data in said created CDB, said first transputer element thereafter transmitting said CDB stored converted data;

a second transputer element connected to said first transputer element and programmed to receive said CDB stored converted from said first transputer element, to operate on said converted data from said CDB to precalculate motion control data therefrom, to create at least one precalculated data buffer (PCB), and to store said precalculated data in said PCB, said second transputer element thereafter transmitting said PCB stored precalculated data;

a third transputer element connected to said second transputer element and programmed to receive said PCB stored data from said second transputer element, to interpolate said precalculated data to provide a real time interpolated point stream defining a desired motion trajectory; and an output bus connected to an output of said third transputer element for outputting said point stream.

2. In a computerized numerical controller system having a part program, an input device, a processor for motion planning and interpolation, machine tool servo drives, a machine tool, and sensor controls and operator controls, the improvement in said processor comprising:

a) a first transputer element having a convert program
  i) to create convert processes for operation on program data read from said part program,
  ii) to start and continuously loop said convert processes,
  iii) to create at least one convert data buffer (CDB),
  iv) to convert said program data to fixed format binary data,
  v) to store said converted data messages in said created CDB, and
  vi) to transmit said CDB stored converted data messages:
b) a second transputer element connected to an output of said first transputer element, and having a precalculate program
  i) to create a receive process for receiving said CDB stored converted data message from said first transputer element CDB,
  ii) to precalculate motion control data from said converted data message,
  iii) to create at least one precalculated data buffer (PCB),
  iv) to store said precalculated motion control data in said PCB, and
  v) transmitting said PCB stored precalculated motion control data;
c) a third transputer element connected to an output of said second transputer element, and having an interpolation program
  i) to create a receive process for receiving said PCB stored motion control data from said second transputer element,
  ii) to interpolate said precalculated data to provide a real time interpolated point stream defining a desired motion trajectory, and
  iii) to create an output bus for outputting said point stream.

3. The improvement as defined in claim 2 in which each of said transputer elements further includes a manual input channel for receiving manual control data.

4. The improvement as defined in claim 2 in which said improvement further includes a fourth transputer element having an input for manual control data, and outputs to said manual input channels of said first, second and third transputer elements for receiving manual control data.

5. The improvement as defined in claim 2 in which said improvement further includes an input channel for initial loading of the respective programs of said first, second, and third transputer elements.

6. The improvement as defined in claim 2 which further includes:
- a fifth transputer element having a program for adaptive control of transputer elements; and
- said second and third transputer elements include inputs from said fifth transputer element for real time modification of interpolation and motion planning processes.

* * * * *